July 18, 1967 TATSU HORI 3,331,532
SEED PLANTING APPARATUS WITH AUTOMATIC SEED TAPE FEED CONTROL
Filed Aug. 1, 1966 2 Sheets-Sheet 1

INVENTOR.
TATSU HORI
BY Samuel Lindenberg
Abraham Wasserman
ATTORNEYS

July 18, 1967 TATSU HORI 3,331,532
SEED PLANTING APPARATUS WITH AUTOMATIC SEED TAPE FEED CONTROL
Filed Aug. 1, 1966 2 Sheets-Sheet 2

INVENTOR
TATSU HORI
BY Samuel Lindenberg
Abraham Wasserman
ATTORNEYS

United States Patent Office 3,331,532
Patented July 18, 1967

3,331,532
SEED PLANTING APPARATUS WITH AUTOMATIC
SEED TAPE FEED CONTROL
Tatsu Hori, Los Altos, Calif., assignor to Stanford Research Institute, Menlo Park, Calif., a corporation of California
Filed Aug. 1, 1966, Ser. No. 569,189
6 Claims. (Cl. 221—13)

This invention relates to planting machinery and more particularly to an apparatus for automatically planting seeds supplied on a seed-laden tape.

In an application for Seed Pregerminating and Planting Process, Ser. No. 301,083, filed Aug. 9, 1963, now Patent 3,294,045, issued Dec. 27, 1966, by Omer J. Kelley et al., there is described and claimed a process whereby seeds are spaced at equal spacings or increments along the length of two rolls of tape to form a seed-laden tape. The seeds are enclosed between the two tapes, one of which may be regarded as a support tape while the other serves as a cover tape. Prior to planting, the tape is treated in a nutrient solution to uniformly pregerminate the seeds thereon. Then, the treated tape is supplied to an automatic planting machine, the function of which is to sever tape increments, assumed to contain single seeds, and plant them in separate equidistantly spaced shallow grooves, such as may be formed by a plow. Hereafter, the shallow grooves will also be referred to as the planting grooves. The expected result of such a process is to produce a uniformly grown crop, maturing at approximately the same time, since it is assumed that single seeds, uniformly pregerminated, are planted at a uniform depth.

Though the process described in the aforementioned application significantly advances the state of the art, it has been found that due to the very small size and/or non-uniformity of the seeds, it is difficult to insure that a single seed is deposited at each equally spaced increment of the tape. From practice, it has been found that in automatically forming the seed-laden tape, some tape increments contain other than one seed. That is, some contain more than one seed while others do not contain even a single seed. When supplying such a tape to the prior art planting apparatus a non-uniformly grown crop results, since in some planting grooves not even a single seed is planted, while in others are planted several seeds, which tend to affect each other's growth.

To remove the tape increments containing other than one seed, a process has been developed to automatically sense equally spaced tape increments containing seeds and severing those increments containing other than one seed. The severing is accomplished by punching a hole at the tape increment location which contains other than one seed. After the hole punching operation, tape portions containing only single seeds remain on the tape, while holes are present at other increments. Such a tape may be thought of as a single-seed-laden type since, at those increments containing seeds, only a single seed is located at each increment.

A need exists for a planting apparatus which is capable of automatically planting single-seed-laden tape increments into equally spaced planting holes in the soil to increase the probability that the planted seeds will produce a uniformly grown crop. Since the tape increments containing seeds may be interspersed by holes in the tape, from which increments containing other than one seed have been punched out, it is important that the apparatus be capable of sensing such holes and in response thereto, advance the tape to insure that when the apparatus is over a planting groove, a tape increment containing a single seed, is in proper position to be severed and planted in the groove. Also, since the apparatus, when moving over soil prepared for seeding, is subjected to a considerable amount of vibration, it is important that all the mechanism needed for automatically handling and sensing the single-seed-laden tape be mechanically rugged, yet simple, to minimize maintenance requirements.

It is therefore a main object of the present invention to provide an apparatus for automatically planting seeds supplied thereto on a single-seed-laden tape.

Another object is to provide a rugged, yet relatively simple, apparatus which in combination with a single-seed-laden tape supplied thereto, automatically plants a tape increment containing a single seed in each of equidistantly spaced planting grooves.

A further object of the invention is the provision of a simple automatic planting apparatus, for use in conjunction with a tape, having some spaced increments which contain single seeds while others define holes, to plant a seed-containing-tape increment in each planting groove, over which the apparatus traverses.

These and other objects of the invention are achieved by providing a planting apparatus which includes a tape severing member, such as a tape punch, a source of a single-seed-laden tape, and a tape advance mechanism which advances the tape from the source to the punch. The apparatus includes a tape sensor, the function of which is to sense the single-seed-laden tape and control the tape advance mechanism to advance the tape, so that a tape increment containing a single seed, rather than one defining a hole, is in a punch position in the punch, to be severed thereby, as the apparatus passes over each planting groove.

The novel features that are considered characteristic of this invention are set forth with particularity in the appended claims. The invention will best be understood from the following description when read in connection with the accompanying drawings, in which:

Figure 1:
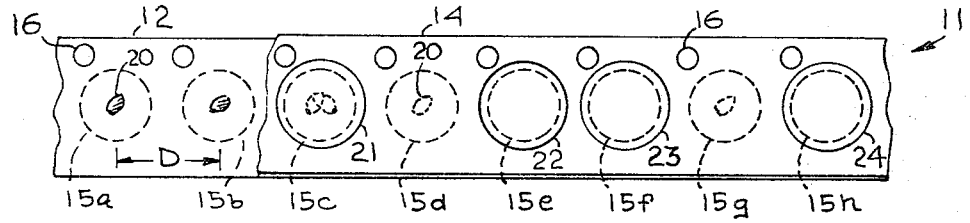
FIGURE 1 is a top view of a single-seed-laden tape of a type used in conjunction with the apparatus of the present invention.

Attention is first directed to FIGURE 1 which is a top view of a single-speed-laden tape 11 comprising a support tape 12 and a cover tape 14, which define tape increments 15a through 15h designed by dashed circles, equally spaced along its length. The single-seed-laden tape 11 also defines equally spaced index holes 16, used to advance the tape by a distance D, equal to the distance or spacing between tape increments.

In the aforementioned application in which a process for forming a seed-laden tape is described, it is assumed that a single seed 20 is deposited at each tape increment and held thereat between the support and cover tapes 12 and 14 respectively. However, from practice, it has been found that though most tape increments contain single seeds, some increments contain other than one seed. In FIGURE 1, increments 15a, 15b, 15d and 15g ar shown each containing a single seed 20, while increment 15c is shown containing two seeds and increments 15e, 15f, and 15h do not contain a single seed.

To form a single-seed-laden tape which, as hereinbefore defined, is a tape in which any tape increment which contains seeds contains only a single seed, tape increments 15c, 15e, 15f and 15h containing other than one seed may be punched out to define apertures 21, 22, 23 and 24 respectively. For explanatory purposes, only the apertures are shown to be slightly larger than the respective tape increments which they represent.

Figure 2:
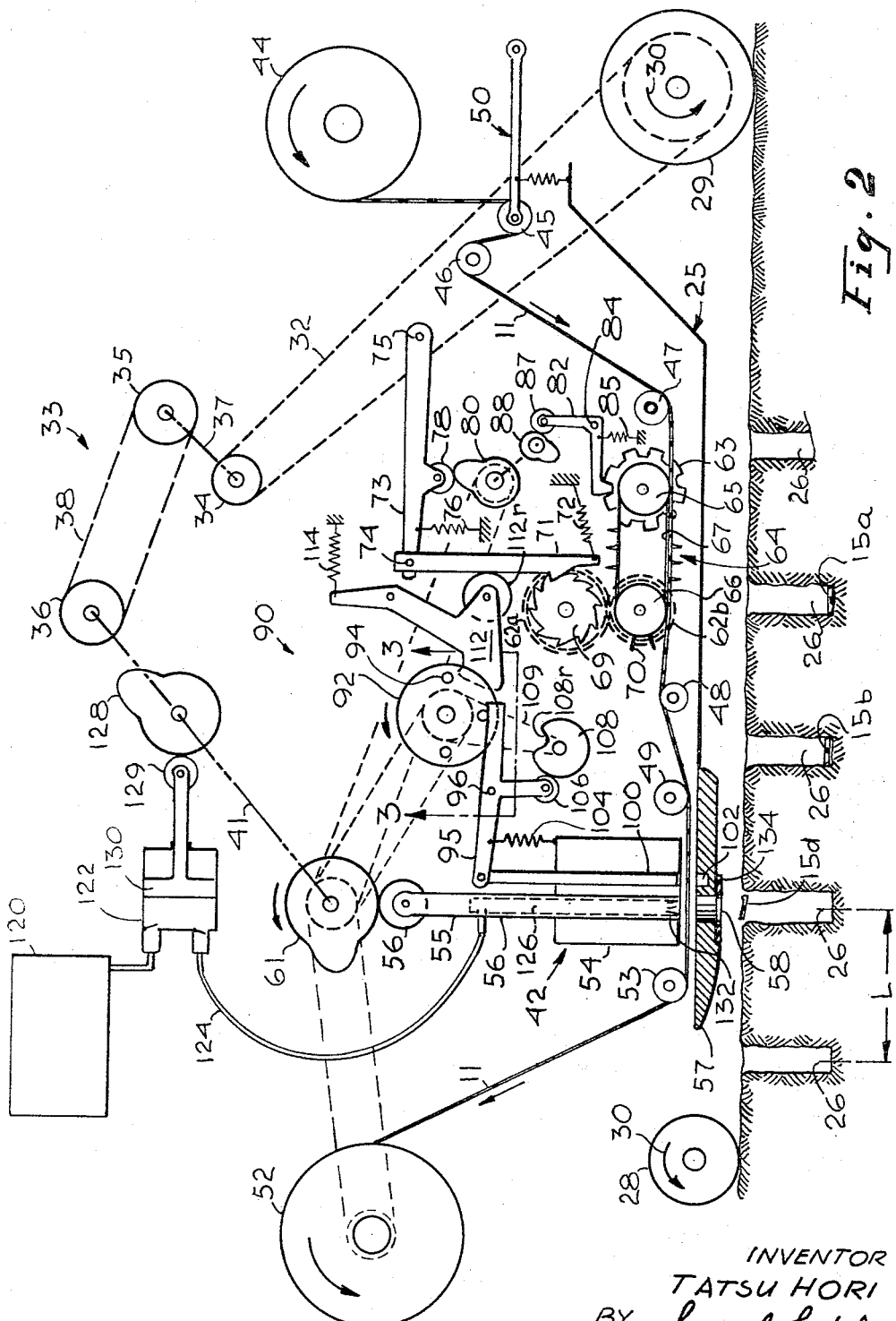
FIGURE 2 is a side cross-sectional view of an embodiment of the seed planting apparatus of the invention.

The single-speed-laden tape 11 is supplied to the plating apparatus of the present invention. A cross-sectional view of one embodiment of the apparatus is shown in FIGURE 2, to which reference is made herein. The apparatus is shown mounted on platform 25 which is caused to traverse over equally spaced plating grooves 26 by means of front and rear support wheels 28 and 29 respectively. The motion of platform 25 and the wheels is indicated by arrow 30. A main chain drive 32 is connected to the transmission center 33 of the apparatus. The center 33 may include pulleys 34, 35 and 36, a shaft 37, a belt 38, and other means, the function of which is to control the rotational ratio between the support wheel 29 and a main drive shaft 41. The rotational ratio is controlled so that as the platform 25 moves a distance L, equal to the planting interval, shaft 41 is rotated through one complete revolution.

For every revolution of shaft 41, a tape increment containing a single seed is punched out by a punch unit 42 from tape 11. The tape is supplied to punch unit 42 from a tape supply roller 44 over idler rollers 45 through 49 and through a tape biasing mechanism 50. A take-up reel 52, driven by a light friction clutch (not shown), is used to take up the tape supplied thereto over roller 53 from unit 42, after the seed containing increments thereof have been punched out.

Basically, punch unit 42 includes a housing 54, a hollow plunger 55 vertically mounted in the housing and having one cutting end and an opposite end on which a cam follower 56 is rotatably mounted. The punch unit 42 also includes a base plate 57, defining an aperture 58. Tape 11 passes through unit 42 between the plate 57 and housing 54. Within housing 54 are included biasing means (not shown) which bias plunger 55 upwardly so that cam follower 56 engages a cam 61. Cam 61 is mounted to one end of shaft 41, so that for every revolution of the shaft, cam 61 by means of cam follower 56 engaged thereto, depresses plunger 56 into and through opening 58 in plate 57, thereby causing it to punch out an increment of tape 11.

The punching is adjusted to occur when the aperture 58 is just above one of the planting grooves 26, so that the tape increment containing a single seed punched out by plunger 55, is automatically planted therein. The grooves may be formed by a plowing member (not shown) coupled to the apparatus which may be actuated to create planting grooves at equally spaced intervals, or produce a continuous groove in the direction of travel of the planting apparatus. Irrespective, however, of the manner of forming the planting grooves, the punching is adjusted to occur once each planting interval defined as one complete revolution of shaft 41 so that the severed tape increments are spaced by the distance L. In FIGURE 2, tape increment 15d is shown dropping into one of grooves 26, while previously severed increments 15b and 15a are shown in precedingly traversed planting grooves. If desired, successively severed increments may be dropped on the ground, with adjacent increments spaced by the distance L.

In addition to the punch unit 42, the apparatus of the invention includes a tape advance mechanism whereby the single-seed-laden tape is advanced so that a tape increment containing a single seed is in unit 42 over apertures 58 during each planting interval. The advance mechanism includes a pair of meshed gear drives 62a and 62b and an indexing wheel 63. An endless chain drive 64 is included, comprising a pair of sprocket wheels 65 and 66 and a chain 67, while gear drive 62a has a ratchet wheel 69 mounted thereon. Chain 67 has mounted on each linkage a sprocket tooth 70. The teeth are spaced so that they engage index holes 16 (FIGURE 1) of tape 11, thus positively advancing the tape.

The driving of the endless chain drive 64 is accomplished by gear drive 62a on which the ratchet wheel 69 is mounted. A pawl 71 biased to engage wheel 69 by a spring 72 has one end pivotably mounted to one end of an arm 73 by means of a pin 74. The other end of arm 73 is pivotable about a pin 75. The position of arm 73 is controlled by a spring 76 which biases the arm toward the wheel 69 and a cam follower 78 which engages a cam 80, rotatably linked to the cam 61 on the main drive shaft 41.

For every revolution of cam 80, with pawl 71 in the position as shown, i.e. in engagement with wheel 69, the wheel rotatably advances by one tooth and thereby turns the endless drive chain 64 to advance the tape 11 by means of teeth 70 a distance equal to the spacing between index holes which equals the spacing D between adjacent tape increments.

To precisely control the advance of sprocket teeth 70, the apparatus includes an L-shaped arm 82 pivotably mounted about its center by a pin 84. One end of arm 82 is biased by a spring 85 to engage the index teeth of wheel 63, while a cam follower 87 is mounted on the other end of arm 82. A cam 88, rotatably coupled to cam 80, acts on cam follower 87 to release arm 82 from in between the teeth of wheel 63 during each chain advance period.

From the foregoing, it should be appreciated that if the rotational ratio between cams 61 and 80 were 1:1, then for each revolution of cam 61 corresponding to an advance of platform 25 from one planting groove 26 to the next hole, the tape would advance a distance equal to the spacing between adjacent increments. Such an arrangement is only satisfactory if every successive tape increment contains a seed, which is not the case in tape 11, shown defining holes such as 21 through 24, representing tape increments which have previously contained other than one seed. Consequently, for each revolution of cam 61, tape 11 may have to be advanced one or more times depending on the maximum number of successive holes which may be expected. Assuming that the maximum number of successive holes is three, the rotational ratio between cams 80 and 61 is 4:1 so that for each revolution of cam 61, cam 80 rotates four times to advance the tape four times by the tape increment spacing D. The number of times the tape is actually advanced depends on the number of holes separating adjacent tape increments containing seeds. The presence of a hole is detected by a tape sensing unit, generally designated in FIGURE 2 by numeral 90.

Briefly, after a tape increment containing a seed is deposited in a planting groove or on the ground, the tape is advanced a distance D. If a hole is sensed, pawl 71 remains engaged with wheel 69 to advance the tape when cam 80 actuates or raises arm 73. If, however, a hole is not sensed, i.e. the succeeding tape increment contains a seed, the sensor 90 disengages the pawl from wheel 69 until the increment containing the seed is severed by plunger 55. In the arrangement shown in FIGURE 2, the sensor is capable of sensing three successive holes and causing the tape to advance four times during each revolution of cam 61 which defines the planting interval.

Figure 3:
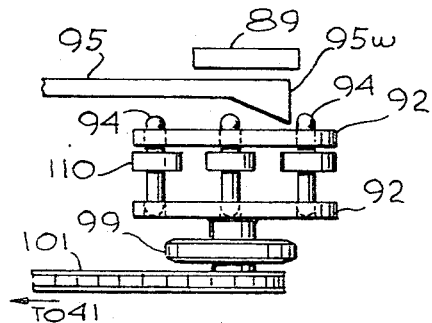
FIGURE 3 is a side cross-sectional view along lines 3—3 of a memory wheel, employed in the apparatus of the invention.

Referring again to FIGURE 2, the sensor 90 is shown including a memory wheel 92 which is driven by the main drive shaft 41 at a one to one (1:1) ratio. Three sliding memory pins 94 are located near the periphery of wheel 92 at 90° intervals. The fourth position is left clear. FIGURE 3, to which reference is made herein, is a view along lines 3—3. The pins 94 are activated by a wedged end 95w of an arm 95, which is pivotable about a pin 96. A back-up plate 98 stabilizes arm 95. In FIGURE 3, numerals 99 and 101 represent a belt and a gear coupled to wheel 92 to rotate it at a one to one ratio by the main drive shaft 41.

The other end of arm 95 (FIGURE 2) is coupled to one end of a feeler shaft 100, vertically positioned in housing 54 of the punch unit 42. An aperture 102 is defined in plate 57 just below shaft 100. A spring 104 biases arm 95 and shaft 100 toward aperture 102. Arm 95 which is illustrated as T-shaped, is pivotable about the point of intersection of its two arms and has a cam follower 106 mounted at its base. The cam follower follows a cam 108 which is rotated by means of a chain 109 coupled to wheel 92 at a 4:1 rotational ratio.

Figure 4A:
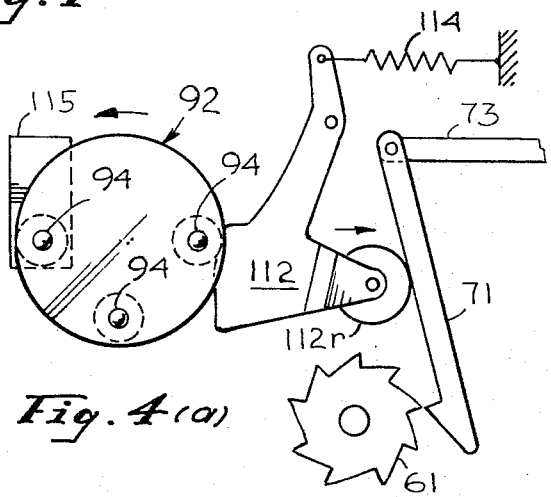
FIGURES 4a, 4b and 5 are partial top and side views of the memory wheel, useful in explaining the function of the wheel and its mode of operation.
Figure 4B:
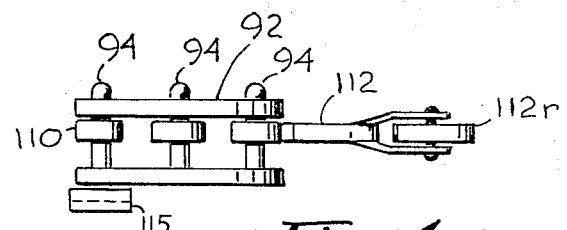

At each revolution of cam 108, a relief portion thereof, designated 108r, enables spring 104 to depress the feeler shaft onto the tape 11. Shaft 100 in essence senses the tape immediately adjacent the tape increment, in the punch position over aperture 58. If the tape increment in the sense position is not punched out, that is it contains a seed rather than defines a hole, feeler shaft does not move below the top surface of tape 11. Consequently, the wedged end 95w of arm 95 cannot swing into the path of pins 94 to depress any of them. When the pins are not depressed, that is a tape increment containing a seed is in the punch position, a bushing 110 on each pin 94 is in a position to actuate a pivotably mounted arm 112, which disengages pawl 71 from ratchet wheel 69, by means of an idler roller 112r, rotatably mounted on arm 112. As a result, the tape does not advance during that planting interval. FIGURES 4a and 4b, to which reference is made herein, are partial top and side views of the wheel 92 and the relative position of arm 112 with respect thereto when none of the pins is depressed. In FIGURE 4b is shown a plate 115, the function of which is to return any depressed pin to its raised position after passing by arm 112. A spring 114 biases arm 110 towards wheel 92.

Figure 5:
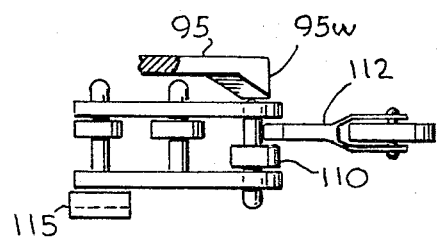

If, however, the tape increment in the punch position defines a hole, such as hole 21 (FIGURE 1), feeler shaft 100 is free to travel into aperture 102. As a result, the wedged end 95w swings in the path of one of the pins. When a pin is depressed, bushing 110 is lowered with the pin. Consequently, arm 112 does not disengage the pawl 71 from wheel 69, causing the tape to advance by one tape increment spacing D. FIGURE 5 represents a partial side view of wheel 92 with one of the pins 94 depressed by wedged end 95w, showing the effect of the lowered bushing 110 on the position of arm 112, whereby pawl 71 remains engaged with wheel 61 to advance tape 11 by a distance D.

At every revolution of memory wheel 92, when the wheel's sector which does not contain a pin is opposite arm 112, the tape 11 is always advanced by the distance D. This sequence follows immediately after each punching operation; that is, the tape is always advanced immediately following the punching out of a tape increment containing a single seed. The three pin positions that follow in sequence as the memory wheel rotates can advance the tape up to three tape increments before the next punching operation, should three successive holes be detected in the tape. Thus, the number of pins is related to the number of successive holes which may be detected in the single-seed-laden tape, during each planting interval.

From the foregoing, it should thus be appreciated that the sensor 90 enables the detection of the holes in tape 11 to insure that successive tape increments containing single seeds are planted during each of a succession of planting intervals so that the seeds are planted at equally spaced intervals. The sensor is completely mechanical, with all moving and rotating parts being of the type which can be constructed and adjusted to perform under relatively severe vibration with a minimum of additional adjustments and maintenance. Thus, the desired characteristics of a rugged planting apparatus are attained.

To facilitate the separation of a severed tape increment containing a seed from base plate 57, the apparatus of the present invention includes a source of liquid, such as a water tank 120, coupled to a cylinder 122 which is connected, by means of a tube 124, to the hollow portion of plunger 55. The hollow portion is desigted in FIGURE 2 by numeral 126. A cam 128 on main drive shaft 41 actuates a cam follower 129, connected to a piston 130 in cylinder 122. During the punching operation, a metered quantity of water is injected into the hollow portion 126 and therefrom ejected through multiple orifices 132 on the bottom face of plunger 55, thus aiding in releasing the cut tape increment from the tape. The water is also helpful in providing desired moisture in the soil surrounding the cut tape increment containing the single seed. A rubber washer 134, whose hole diameter is slightly smaller than the diameter of plunger 55, may be employed to strip the severed tape increment from the bottom of the plunger, as the plunger is raised out of aperture 58 back into housing 54 by any conventional upward biasing means (not shown).

Figure 6:
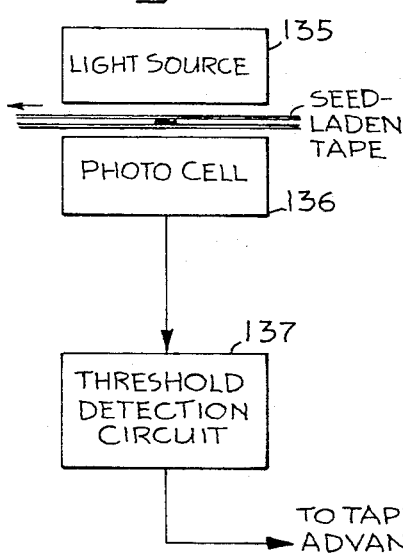
FIGURE 6 is a block diagram of an electronic tape sensor which may be employed in another embodiment of the invention.

Herebefore, the invention has been described in conjunction with a mechanical sensor which senses holes in the single-seed-laden tape 11 to advance the tape so that a tape increment with a single seed is planted in each planting hole. Thus, the main function of the sensor is to advance the tape so that an increment containing a single seed is in the punching position as the apparatus traverses each planting hole. In situations where the expected vibration is not too severe, the seed-laden tape formed in accordance with the process of the aforementioned application, instead of being prepunched to remove the increments containing other than one seed, may be directly supplied to another embodiment of the apparatus of the invention, which includes an electromechanical sensor. Such sensor may be designed to sense the number of seeds at each tape increment and provide tape advancing signals whenever the number of seeds at each increment is other than one. For example, as shown in FIGURE 6, to which reference is made herein, such a sensor may include a light source 135 and a photocell 136 with the seed-laden tape passing therebetween. The photocell 136 may be adjusted so that its output is related to the number of seeds detected in the tape 11. The output of cell 136 may then be supplied to a threshold detection circuit 137, the function of which is to produce an output signal whenever the output of cell 136 represents the detection of other than one seed. The output signal of circuit 137 may be supplied to a tape advance mechanism which advances the tape until a tape increment with a single seed is detected. The output signal of circuit 137 is analogous to depressing a pin 134 which results in the advance of the tape 11 by a distance D.

There has accordingly been shown and described a novel apparatus for automatically planting tape increments containing single seeds severed from a single-seed-laden tape in successive planting grooves or at fixed spacings L. A sensor is included which senses the tape and advances it so that each successive tape increment containing a single seed is severed from the tape and planted during each successive planting interval. It is appreciated that those familiar with the art may make modifications in the arrangements as shown without departing from the spirit of the invention. Therefore, all such modifications are deemed to fall within the scope of the invention as defined in the appended claims.

What is claimed is:

1. An apparatus for planting tape increments containing single seeds at equidistantly spaced locations along a path traversed by said apparatus, the distance between adjacent locations defining a planting interval, the apparatus comprising:

a source of a seed-laden tape, said tape comprising an elongated member defining equally spaced tape increments along its length and seeds affixed thereon, single seeds being affixed at at least some of said tape increments;

a tape severing member for severing tape increments containing single seeds from said tape;

means for actuating said tape severing member once each time said apparatus is advanced along said path a distance substantially equal to said planting interval; and tape advance mechanism including tape sensing means for advancing said tape whereby a tape increment containing a single seed is in said tape severing member to be severed thereby each time said member is actuated.

2. The apparatus defined in claim 1 wherein in said tape increments containing single seeds are interspersed by tape increments defining apertures, said tape sensing means including means for sensing the presence of said apertures to actuate said tape advance mechanism so as to advance said tape during the time the apparatus advances said planting interval so that when said tape severing member is actuated, a tape increment containing a single seed rather than one defining an aperture is in said severing member to be severed thereby.

3. The apparatus defined in claim 2 wherein said tape sensing means includes a mechanical sensor positioned adjacent said tape severing member, said mechanical sensor being biasable into a first position through one of said apertures when an aperture-defining tape increment is in said tape severing member, said tape advance mechanism including means responsive to the mechanical sensor in said first position for advancing said tape a distance equal to the spacing between adjacent tape increments along said tape.

4. The apparatus defined in claim 3 wherein said tape advance mechanism includes a disc, rotatable one revolution each time said apparatus advances a distance equal to said planting interval, $n$ pins mounted on said disc, each pin being actuatable when said sensing member is in said first position to advance said tape by said distance, $n$ being equal to the maximum number of successive apertures in said tape, between adjacent tape increments containing single seeds.

5. The apparatus defined in claim 4 wherein said tape advance mechanism includes a ratchet wheel and a pawl engageable therewith, said pawl being actuatable $n+1$ times to incrementally advance said ratchet wheel $n+1$ increments during the advance of said apparatus by a distance equal to each planting interval, each advance increment of said ratchet wheel corresponding to an advance of said tape by said distance, and a pivotable member responsive to the position of each pin on said disc for maintaining said pawl in engagement with said ratchet wheel when said pin is actuatable by said sensing member in said first position, whereby said tape advances by said distance when said sensor is in said first position.

6. The apparatus defined in claim 1 wherein said tape sensing means comprises means for sensing the number of seeds affixed to each tape increment to advance said tape so that a tape increment containing a single seed is in said severing member to be severed thereby.

References Cited

UNITED STATES PATENTS

| | | | |
|---|---|---|---|
| 2,802,598 | 8/1957 | Petterson | 221—13 |
| 3,027,047 | 3/1962 | Johnson | 221—25 X |
| 3,260,404 | 7/1966 | Critchell | 221—25 X |
| 3,294,045 | 12/1966 | Kelley et al. | 111—1 |

SAMUEL F. COLEMAN, *Primary Examiner.*